United States Patent
Perz et al.

(10) Patent No.: US 7,627,153 B2
(45) Date of Patent: Dec. 1, 2009

(54) REPOSITIONING INACCURACIES IN AN AUTOMATED IMAGING SYSTEM

(75) Inventors: Cynthia B. Perz, Huntington Beach, CA (US); Robert T. Ellis, Dana Point, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 884 days.

(21) Appl. No.: 11/198,018

(22) Filed: Aug. 4, 2005

(65) Prior Publication Data

US 2007/0029462 A1 Feb. 8, 2007

(51) Int. Cl.
*G06K 9/00* (2006.01)
(52) U.S. Cl. ........................ 382/128; 382/133
(58) Field of Classification Search ......... 382/128–133, 382/162; 341/50; 250/208.1
See application file for complete search history.

(56) References Cited

U.S. PATENT DOCUMENTS

| | | |
|---|---|---|
| 4,012,111 A | 3/1977 | Masterson |
| 4,012,112 A | 3/1977 | Masterson |
| 4,019,819 A | 4/1977 | Lodzinski |
| 4,029,949 A | 6/1977 | Dew |
| 4,159,874 A | 7/1979 | Dearth et al. |
| 4,239,395 A | 12/1980 | Modisette |
| 4,288,160 A | 9/1981 | Lodzinski |
| 4,513,438 A | 4/1985 | Graham et al. |
| 4,618,938 A | 10/1986 | Sandland et al. |
| 4,647,764 A | 3/1987 | Chandwick et al. |
| 5,153,745 A | 10/1992 | Brandkamp et al. |
| 5,294,805 A | 3/1994 | Izraelev |
| 5,315,700 A | 5/1994 | Johnston et al. |
| 5,323,528 A | 6/1994 | Baker |
| 6,005,964 A | 12/1999 | Reid et al. |
| 6,103,338 A | 8/2000 | Gille et al. |
| 6,151,405 A | 11/2000 | Douglass et al. |
| 6,215,892 B1 | 4/2001 | Douglass et al. |
| 6,330,349 B1 | 12/2001 | Hays et al. |
| 6,404,906 B2 | 6/2002 | Bacus et al. |
| 6,418,236 B1 | 7/2002 | Ellis et al. |
| 6,522,774 B1 | 2/2003 | Bacus et al. |
| 6,546,123 B1 | 4/2003 | McLaren et al. |
| 6,553,135 B1 | 4/2003 | Douglass et al. |
| 6,606,413 B1 | 8/2003 | Zeineh |
| 6,631,203 B2 | 10/2003 | Ellis et al. |
| 6,671,393 B2 | 12/2003 | Hays et al. |
| 6,674,884 B2 | 1/2004 | Bacus et al. |
| 6,718,053 B1 | 4/2004 | Ellis et al. |
| 6,798,571 B2 | 9/2004 | Wetzel et al. |
| 6,816,606 B2 | 11/2004 | Wetzel et al. |
| 6,920,239 B2 | 7/2005 | Douglass et al. |
| 6,947,583 B2 | 9/2005 | Ellis et al. |
| 6,993,169 B2 | 1/2006 | Wetzel et al. |
| 7,133,545 B2 | 11/2006 | Douglass et al. |
| 7,155,049 B2 | 12/2006 | Wetzel et al. |
| 7,177,454 B2 | 2/2007 | McLaren et al. |
| 7,190,818 B2 | 3/2007 | Ellis et al. |
| 7,212,660 B2 | 5/2007 | Wetzel et al. |
| 7,224,839 B2 | 5/2007 | Zeineh |

(Continued)

*Primary Examiner*—Duy M Dang
(74) *Attorney, Agent, or Firm*—Patterson, Thuente, Skaar & Christensen PA

(57) ABSTRACT

Systems and techniques for reducing repositioning inaccuracies in imaging systems. Initial image data and positional information is received and cross-correlated with additional image data and positional information. An offset may be determined based on the cross-correlation.

23 Claims, 6 Drawing Sheets

U.S. PATENT DOCUMENTS

| | | |
|---|---|---|
| 7,359,536 B2 | 4/2008 | Hays et al. |
| 7,359,548 B2 | 4/2008 | Douglass et al. |
| 7,391,894 B2 | 6/2008 | Zeineh |
| 7,421,102 B2 | 9/2008 | Wetzel et al. |

REPOSITIONING INACCURACIES IN AN AUTOMATED IMAGING SYSTEM

TECHNICAL FIELD

Systems and techniques herein relate to registering images of biological samples.

BACKGROUND

Biological samples may be analyzed by marking them with a stain selected to reveal particular sample features (e.g., cancer cells). The sample may then be imaged using a microscope, and analyzed based on the acquired image.

Some existing automated imaging systems capture microscopic image data use a scanning instrument (for example, a digital camera) in combination with a computer-controlled microscope. In order to examine some small sample features, it may be necessary to capture images of areas of the sample at various magnifications.

For example, in order to detect a small number of cancer cells in a biological sample, the sample may be marked using a stain that turns cancer cells red. A first, low resolution image of the sample may be obtained. Regions that appear to include red-stained features may subsequently be imaged at a higher resolution, and the higher resolution images analyzed to determine the presence of cancer cells. Alternatively, the entire sample may be imaged at a high resolution, and the resulting image analyzed to detect the presence of cancer cells.

SUMMARY

In general, in one aspect, a method may include receiving initial image data obtained using an imaging system and corresponding to a first sample area of a biological sample (e.g., reading the initial image data from a memory). The first sample area may include a target or area of interest. The method may further comprise receiving initial positional information for the initial image data, where the initial positional information is indicative of an initial relative position of the first sample area with respect to the imaging system.

The method may further comprise receiving additional image data obtained using the imaging system, the additional image data obtained after repositioning the first sample area with respect to the imaging system. The method may further comprise receiving additional positional information for the additional image data, the additional positional information indicative of a re-positioned relative position of the first sample area with respect to the imaging system.

The method may further comprise cross-correlating at least a portion of the initial image data and the additional image data using the associated initial image data, initial positional information, additional image data, and additional positional information. The method may further include determining an offset based on the cross-correlating. The offset may include a translational offset, a rotational offset, and/or a scale difference offset.

The method may further comprise producing an output indicative of the offset, may include receiving the output indicative of the offset, repositioning the first sample area relative to the imaging system, and obtaining repositioned image data.

The method may include determining whether the additional image data is sufficient for cross-correlation with the initial image data. If the additional image data is not sufficient for cross-correlation with the initial image data, the method may include receiving different additional image data.

The details of one or more implementations are set forth in the accompanying drawings and the description below. Other features and advantages will be apparent from the description and drawings, and from the claims.

DESCRIPTION OF DRAWINGS

FIG. 4 illustrates an image area of a scan region that the microscope imaging system is to return to.

Like reference symbols in the various drawings indicate like elements.

DETAILED DESCRIPTION

Figure 1:
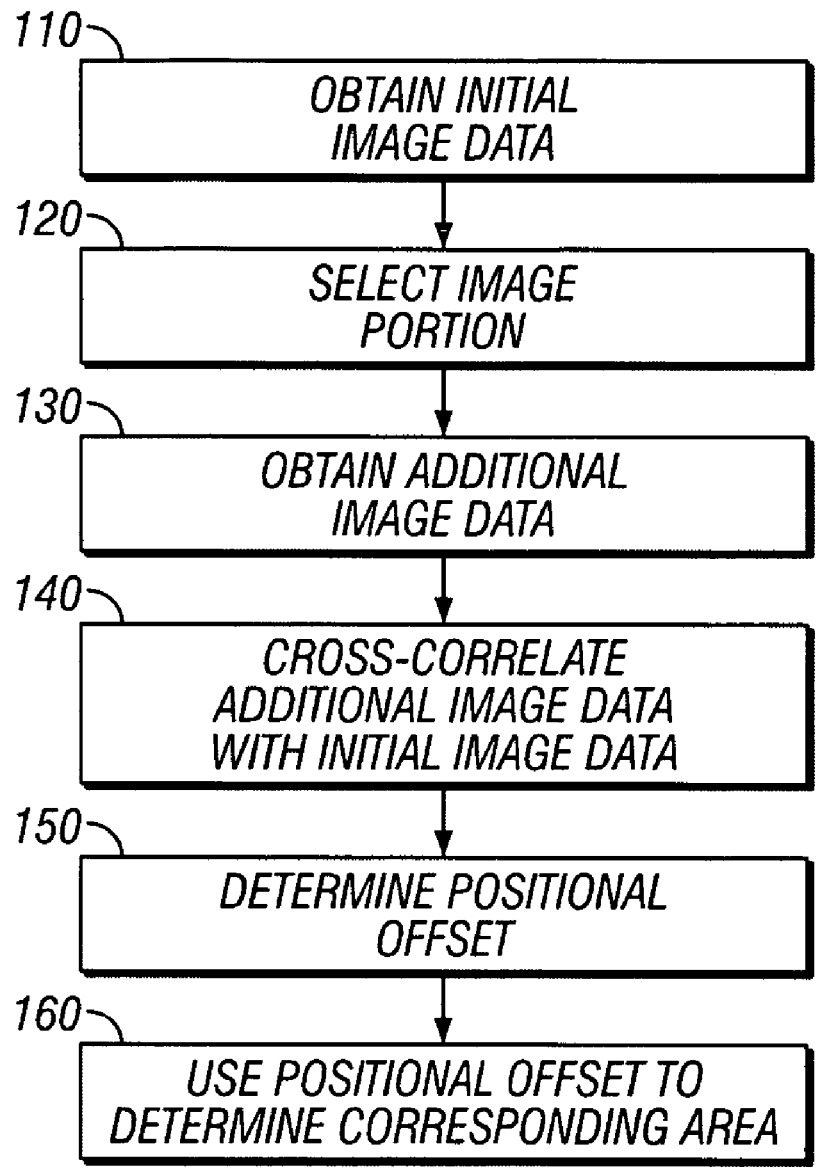
FIG. 1 is a flow diagram of a method for reducing positional inaccuracies, according to some implementations.

The general structure and techniques, and more specific embodiments which can be used to effect different ways of carrying out the more general goals are described herein.

In biological sample imaging and image analysis, it can be challenging to obtain high resolution image data within time, data storage, and/or data analysis constraints. For example, a high resolution image of an entire biological sample will ensure that high resolution image data is available for each interesting region on the sample. However, obtaining such an image may require impractically long data retrieval times, data storage capability, and/or data analysis capability.

Rather than obtaining a single high resolution image of a biological sample, high resolution images of portions of the sample may be obtained. One approach to more efficiently obtain and analyze image data is to perform a "silhouette scan" of a biological sample. Systems and techniques for performing silhouette scans are disclosed in U.S. patent application Ser. No. 10/413,493, filed Apr. 11, 2003, the disclosure of which is incorporated herein by reference.

In an example of a silhouette scan, an imaging system captures an image area including the biological sample. For example, the system identifies "interesting" and "non-interesting" regions of the image, and discards data associated with the non-interesting regions. All image data corresponding to the non-interesting regions can then be set to a particular value, while the image data corresponding to the interesting regions may be stored with little or no loss.

The silhouette scan allows for a user to view a low magnification image of the entire image region, and then allows a user to select one or more portions of the region to be displayed at higher resolution. The system can retrieve the higher resolution image data corresponding to the selected portions, and display the image data to the user.

In effect, an automated imaging system incorporating silhouette scanning can recreate the experience of using a conventional microscope to first view the entire sample at a low magnification, then subsequently view particular portions at a higher magnification.

Using techniques such as silhouette scanning rather than high resolution imaging of an entire sample may allow for more efficient image acquisition, storage, and analysis. However, navigating an image accurately may pose a challenge. For example, after obtaining a low resolution image of the entire sample, factors such as mechanical drift may affect the system's ability to accurately return to particular regions of the sample to obtain higher resolution images.

This problem may be exacerbated when a slide (or other substrate for the biological sample) needs to be re-loaded in the system. Because the re-loading process generally results in slight offsets in orientation of the slide, relocation of the slide to the particular area will generally not be representative of the same image area identified by the user.

Systems and techniques described herein provide for improved image navigation, even when a slide is reloaded. An image of a particular area generated after relocation of a slide to the particular area may be substantially the same as the initial image of the area. The image may be of the same or different magnification.

Although some available systems provide the ability to view an image of a slide, they generally do not allow a user to return to a particular slide area with a high degree of accuracy. In order to position a slide to image a previously imaged area, available systems may automatically move the stage to the same stage coordinates that were used previously. However, errors due to difference in slide position upon movement or reloading, as well as errors associated with stage movement cause the same stage coordinates to correspond to a slightly different area on the slide.

As a result, in some current systems, the system uses the stage coordinates to position the slide approximately. The slide is then manually adjusted to image the particular area that had previously been imaged. Calibration of an automated microscope system may mitigate positional errors to some extent. However, calibration is generally directed to specific error types (such as temperature-induced errors) but does not address other sources of positional error.

The current disclosure provides systems and techniques that may be used to automatically reposition an automated-microscope system more accurately than current systems. FIG. 1 shows an exemplary implementation of a method 100 that may be used to reduce or eliminate repositioning inaccuracies. At 110, an imaging system obtains initial image data for one or more microscopic image(s) of a biological sample. At 120, an image portion is selected, where the image portion corresponds to a particular area of the sample to be re-imaged and/or re-viewed. At 130, additional image data (e.g., higher resolution image data) is obtained. At 140, the additional image data is cross-correlated with the original image data (e.g., low-resolution image data). At 150, a positional offset is determined. At 160, the positional offset is then used to determine the portion of the additional image data corresponding to the particular area.

In different implementations, the systems and techniques herein can be implemented on, for example, an automated microscope system, an automated telescope system, a satellite imaging system, or other system. However, the method will be described herein using an exemplary microscope system.

Figure 2:
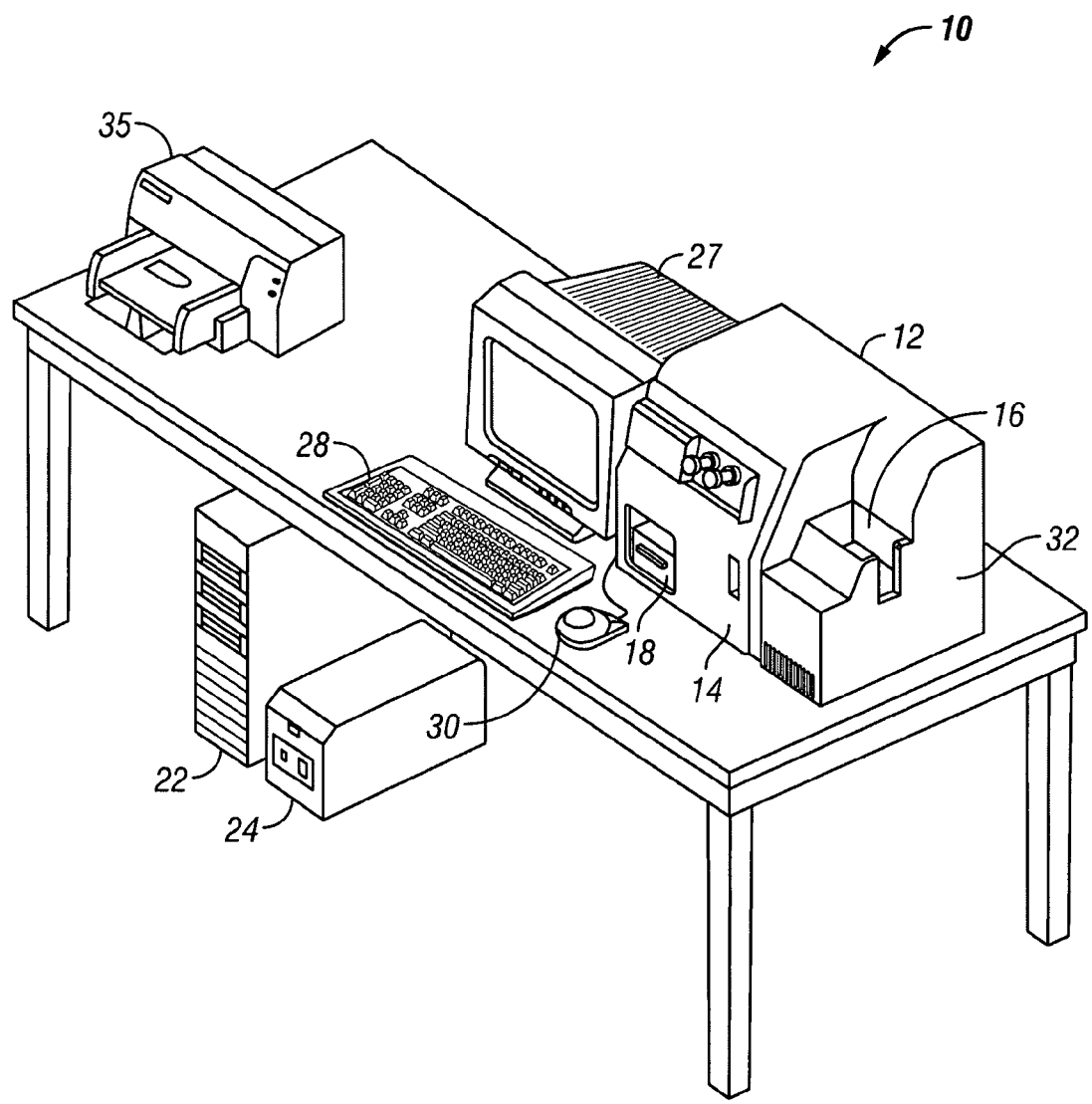
FIG. 2 is a perspective view of an exemplary apparatus for automated cell analysis, according to some implementations.
Figure 3A:
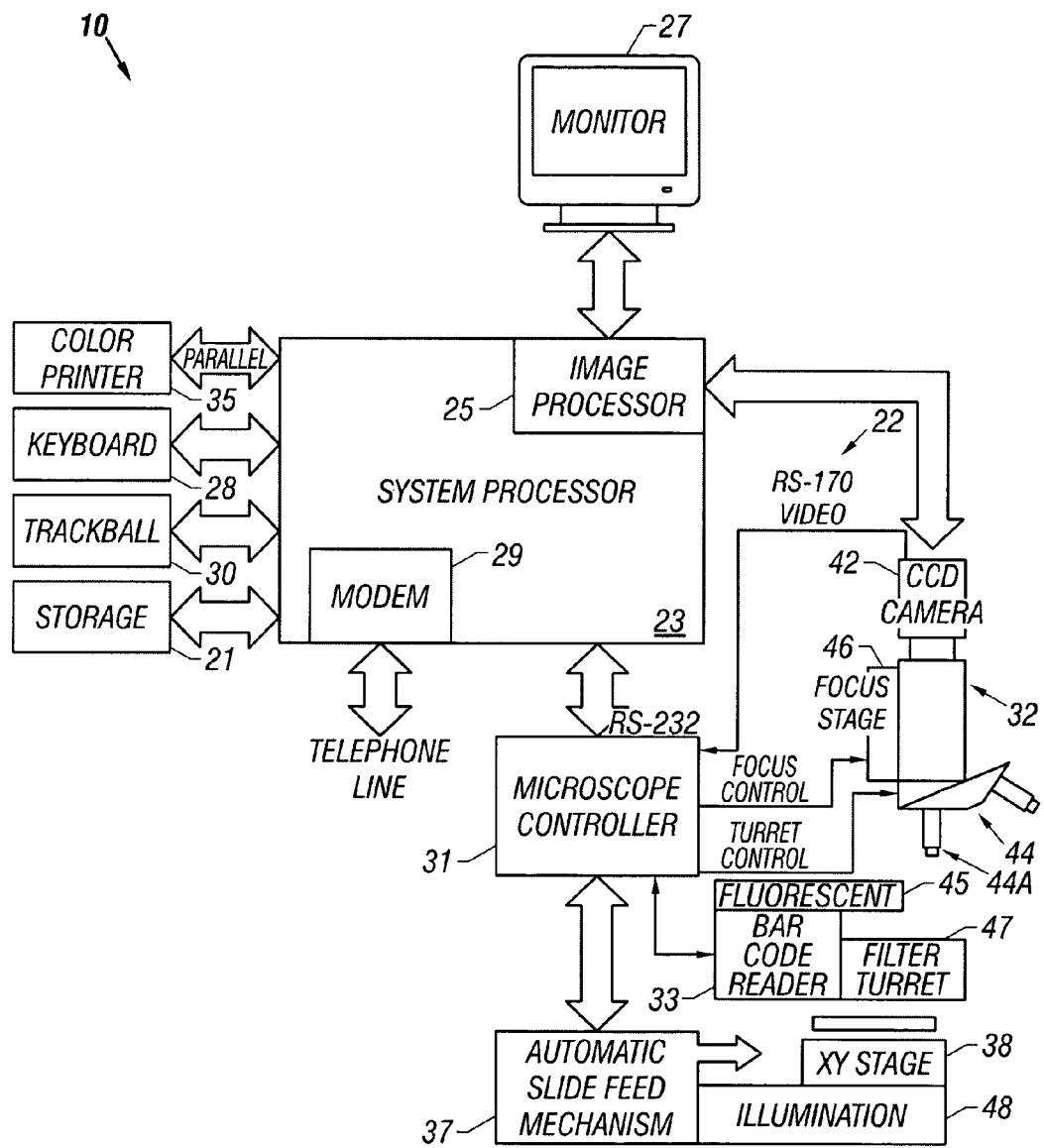
FIG. 3A is a block diagram of the apparatus shown in FIG. 2.
Figure 3B:
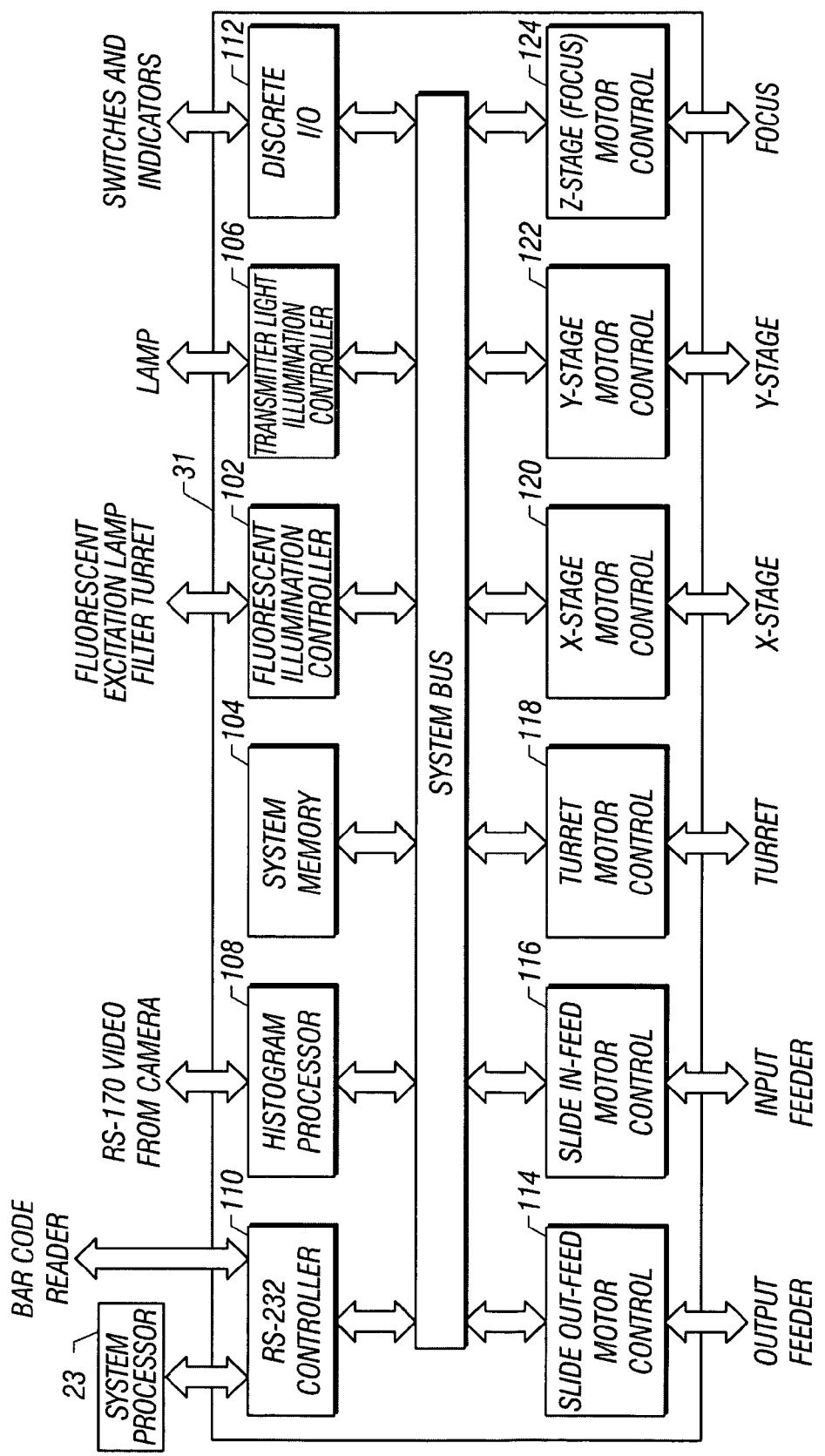
FIG. 3B is a block diagram of the system processor of FIG. 3A.

Referring now to FIGS. 2, 3A, 3B, and 4, a machine vision apparatus for automated analysis of biological samples is generally indicated by reference numeral 10 as shown in perspective view in FIG. 2 and in block diagram form in FIG. 3A. The apparatus 10 comprises a microscope subsystem 32 housed in a housing 12. The housing 12 includes a slide carrier input hopper 16 and a slide carrier output hopper 18. A door 14 in the housing 12 secures the microscope subsystem from the external environment.

A computer subsystem comprises a computer 22 having at least one system processor 23, and a communications modem 29. The computer subsystem further includes a computer/image monitor 27 and other external peripherals including storage device 21, a pointing device, such as a track ball or mouse device 30, a user input device, such as a touch screen, keyboard, or voice recognition unit 28 and color printer 35. An external power supply 24 may also be present for power outage protection.

The apparatus 10 further includes an optical sensing array 42 such as, for example, a CCD camera for acquiring images. Microscope movements are under the control of system processor 23 through a number of microscope-subsystems. Note that the system and sub-systems described and illustrated herein are exemplary. Systems and techniques for different implementations may include more, fewer, and/or different features and sub-systems than described.

An automatic slide feed mechanism in conjunction with X-Y stage 38 provide automatic slide handling in the apparatus 10. An illuminator 48 comprising a bright field transmitted light source projects light onto a sample on the X-Y stage 38, which is subsequently imaged through the microscope subsystem 32 and acquired through optical sensing array 42 for processing by the system processor 23. A Z stage or focus stage 46 under control of the system processor 23 provides displacement of the microscope subsystem in the Z plane for focusing. The microscope subsystem 32 further includes a motorized objective turret 44 for selection of objectives.

The apparatus 10 may also include a fluorescent excitation light source 45 and may further include a plurality of fluorescent filters on a turret or wheel 47. Alternatively, a filter wheel may have an electronically tunable filter. In one aspect, fluorescent excitation light from fluorescent excitation light source 45 passes through fluorescent filter 47 and proceeds to contact a sample on the XY stage 38. Fluorescent emission light emitted from a fluorescent agent contained on a sample passes through objective 44a to optical sensing array 42. The fluorescent emission light forms an image, which is digitized by an optical sensing array 42, and the digitized image is sent to an image processor 25 for subsequent processing. The image processor 25 may be a component of the system processor 23 or a separate and distinct component of the system.

Apparatus 10 may be used to automatically scan prepared microscope slides. Image data may be analyzed to detect candidate objects or areas of interest such as normal and abnormal cells, e.g., tumor cells. The digital images obtained by the automated microscope system are comprised of a series of pixels arranged in a matrix.

In some implementations, scanning begins with the automatic loading of a slide or slide carrier onto the precision motorized X-Y stage 38. In one aspect of the disclosure, a bar code label affixed to the slide or slide carrier is read by a bar code reader 33 during this loading operation. Each slide is then scanned or imaged at a desired magnification, for example, 4× or 10×, to identify candidate cells or objects or areas of interest based on their color, size and shape characteristics.

The object or area's coordinate(s) may be noted, where the term "coordinate" or "address" refers to a particular location which, in a perfect system, would correspond to a particular viewing location. A coordinate or address can be identified in a number of ways including, for example, X-Y coordinates, r-θ coordinates, polar, vector or other coordinate systems.

To avoid missing candidate cells or objects or areas of interest, the system can process low magnification images by reconstructing the image from individual fields of view and then determine objects or areas of interest. In this manner, objects or areas of interest that overlap more than one objective field of view may be identified. In some aspects, a single low magnification image is acquired that is at a sufficiently low magnification that the whole (or a substantial portion thereof, e.g., 70%-99%) of the sample is imaged at one time.

The apparatus comprises a storage device 21 that can be used to store image(s) for later review by a pathologist or to store identified coordinates for later use in processing the sample or a subsample. The storage device 21 can be a removable hard drive, DAT tape, local hard drive, optical disk, or may be an external storage system whereby the data is transmitted to a remote site for review or storage.

The methods, system, and apparatus of the disclosure can obtain a first image at either a low magnification or high magnification and then return to the coordinates (or corrected coordinates) to obtain a further image.

Figure 4:
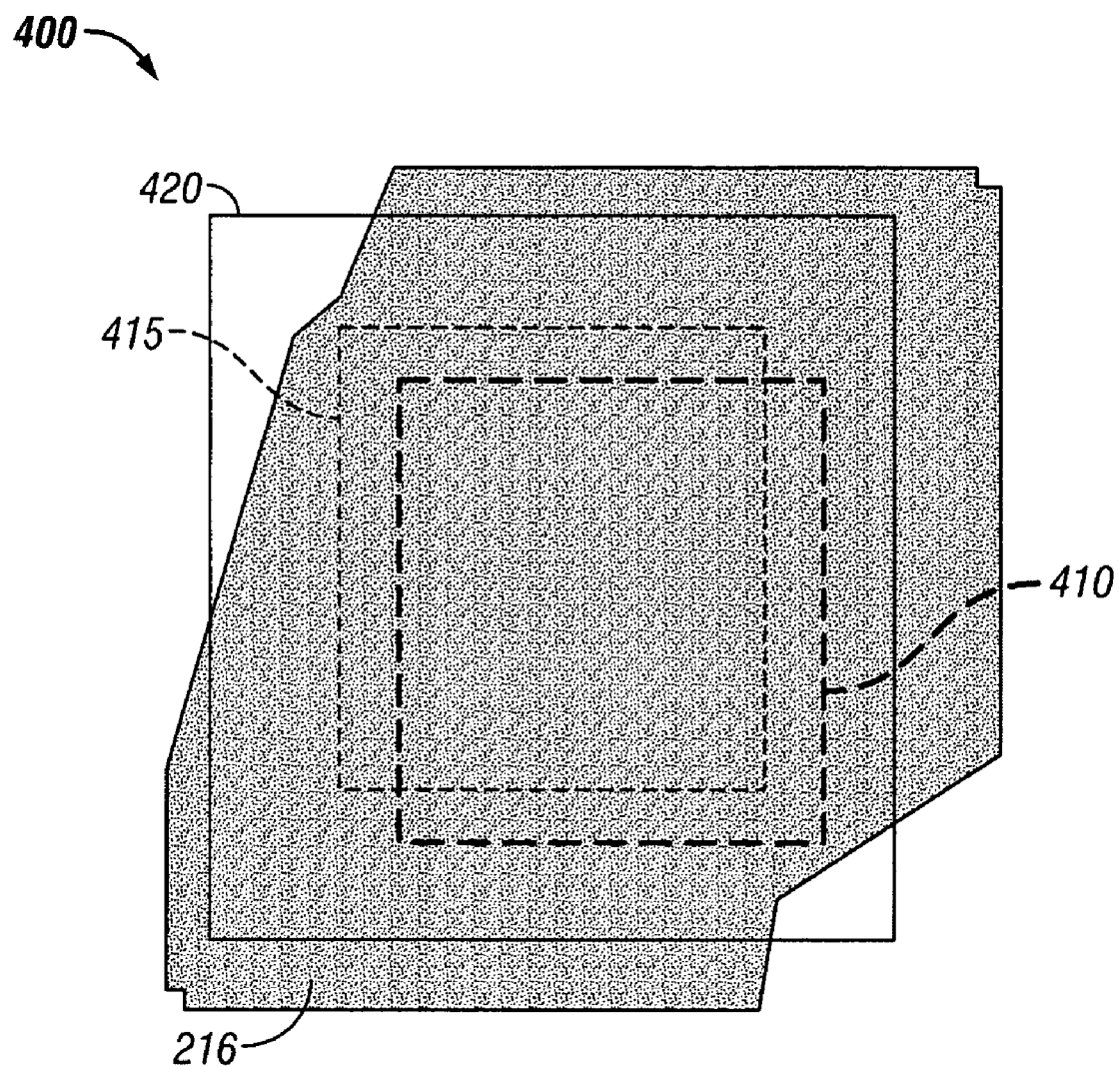

FIG. 4 illustrates an image area 400 that is to be revisited or re-imaged. For example, the user selects a location or region of the image to view at a different magnification, different focus depth, or to visit the image "live" in order to simulate the use of a conventional microscope. As a result, microscope 10 is commanded to move to and display a desired region of image area 400. This may require the microscope system 10 to reload the slide. With respect to FIG. 4, the desired region is indicated by 410. It is understood that desired region 410 could correspond to a single previously obtained image, a region spanning more than one previously obtained images, a fraction of a previously obtained image, or other region.

Microscope system 10 is commanded to capture the desired region 410. However, because of mechanical inaccuracies of microscope system 10, the stage 38 will not be positioned exactly at desired region 410, and a different image will be captured than what was expected. An example of an offset due to mechanical or other inaccuracies in relocating to the desired region 410 is illustrated as an uncorrected area 415.

In order to reduce or eliminate such repositioning inaccuracies, systems and techniques herein provide for cross-correlation to determine a positional offset. For example, microscope system 10 may use a cross-correlation algorithm (e.g., a conventional cross-correlation algorithm) to correlate uncorrected area 415 with a histological correlation area 420, and thus determine the position of uncorrected area 415.

Histological correlation area 420 is a region of image area 400 that is already captured and stored during the scan process, and is (for example) automatically chosen by microscope system 10 out of stored image data. Note that histological correlation area 420 includes desired region 410, plus an additional area large enough to encompass the expected error offset between desired region 410 and uncorrected area 415. If uncorrected area 415 is deemed unacceptable for cross-correlation due to, for example, the nature of the image or material contained within uncorrected area 415, the system may determine, capture, and cross-correlate using a better area as determined by microscope imaging system 10.

A brief description of one exemplary algorithm for template matching by cross-correlation follows. The use of cross-correlation for template matching is motivated by the distance measure (squared Euclidean distance)

$$d_{f,t}^2(u, v) = \sum_{x,y} [f(x, y) - t(x - u, y - v)]^2$$

(where f is the image and the sum is over x, y under the window containing the feature t positioned at u, v). In the expansion of $d^2$ $$d_{f,t}^2(u, v) = \sum_{x,y} [f^2(x, y) - 2f(x, y)t(x - u, y - v) + t^2(x - u, y - v)]$$

the term $$\sum t^2(x - u, y - v)$$

is constant. If the term $$\sum f^2(x, y)$$

is approximately constant then the remaining cross-correlation term $$c(u, v) = \sum_{x,y} f(x, y)t(x - u, y - v) \quad (1)$$

is a measure of the similarity between the image and the feature.

There may be some disadvantages to using (1) for template matching. For example, (i) if the image energy $$\sum f^2(x, y)$$

varies with position, matching using (1) can be problematic (e.g., the correlation between the feature and an exactly matching region in the image may be less than the correlation between the feature and a bright spot), (ii) the range of c(u, v) is generally dependent on the size of the feature, and (iii) equation (1) is not invariant to changes in image amplitude such as those caused by changing lighting conditions across the image sequence.

The following may overcome these difficulties by normalizing the image and feature vectors to unit length, yielding a cosine-like correlation coefficient $$\gamma(u, v) = \frac{\sum_{x,y} [f(x, y) - \bar{f}_{u,v}][t(x - u, y - v) - \bar{t}]}{\left\{ \sum_{x,y} [f(x, y) - \bar{f}_{u,v}]^2 \sum_{x,y} [t(x - u, y - v) - \bar{t}]^2 \right\}^{0.5}} \quad (2)$$

where $\bar{t}$ is the mean of the feature and $\bar{f}_{u,v}$ is the mean of f(x, y) in the region under the feature. However, equation (2) may not be the ideal approach to feature tracking, since it is generally not invariant with respect to imaging scale, rotation, and perspective distortions. These limitations have been addressed in various schemes including some that incorporate normalized cross-correlation (NCC) as a component. For example, a sequential similarity detection (SSDA) implementation of cross-correlation proceeds by computing the summation in (1) in random order and uses the partial computation as a Monte Carlo estimate of whether the particular match location will be near a maximum of the correlation surface. The computation at a particular location is terminated before completing the sum if the estimate suggests that the location corresponds to a poor match. SSDA performs well when the correlation surface has shallow slopes and broad maxima.

By correlating uncorrected area 415 with histological correlation area 420 and determining the location of uncorrected area 415, microscope imaging system 10 can calculate an offset representing the difference between the locations of desired region 410 and uncorrected area 415. This offset may include translations, rotations, and/or scale differences. If desired region 410 represents a change in objective, the offset calculation requires an adjustment to the offset based on the scale change of the objective.

In some implementations, microscope system 10 may resample histological correlation area 420 at a different magnification before performing cross-correlation. In addition to improving the chance of correlation match with uncorrected area 415, resampling histological correlation area 420 provides the added benefit of capturing desired region 410 data at the new magnification and may be utilized in cases where a rescan or live visit is not necessary to show desired region 410.

Microscope system 10 moves the stage 38 by the offset to capture a corrected desired region corresponding to desired region 410 originally selected or intended by the user or system. In cases where desired region 410 represents an area whose image data is already captured in a previous function by microscope system 10, such as the resample of histological correlation area 420 at a different objective, microscope imaging system 10 may simply reload the correct image data from memory rather than reposition the sample on the stage 38.

Figure 5:
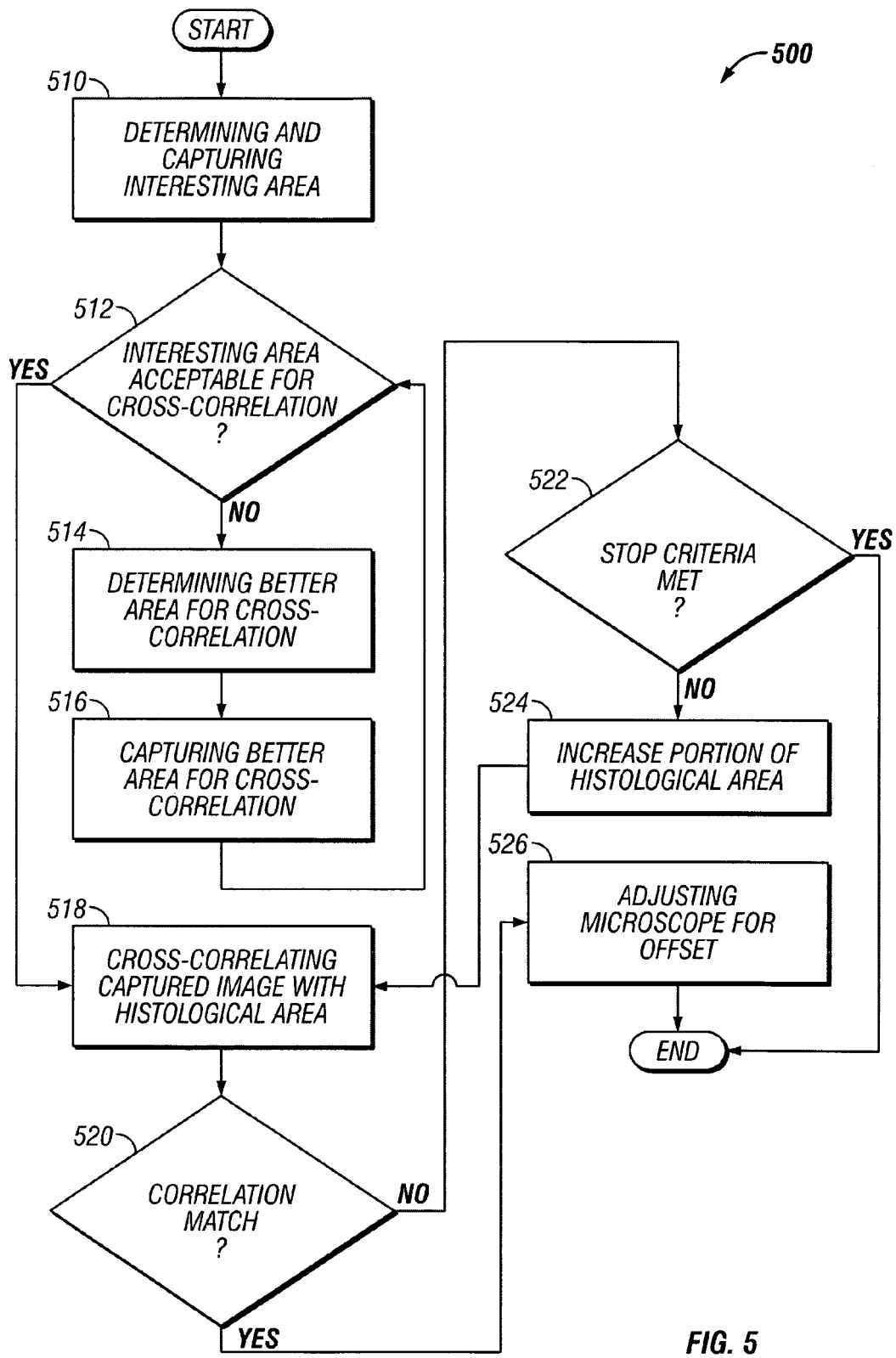
FIG. 5 illustrates a flow diagram of a method of calculating and utilizing a positional offset between a stored and captured image in order to display an expected image, according to some implementations.

FIG. 5 illustrates a flow diagram of a method 500 of calculating and utilizing an offset between a stored and captured image in order to display an expected image. The method takes into account inaccuracies of automated imaging systems and identifies and/or displays an expected image.

A user or computer identifies 510 a desired region 410. In one example, the user, such as a pathologist or clinician, views a histological image and selects an area, such as desired region 410, and commands microscope system 10 to either display desired region 410 live or to re-image desired region 410 at a different magnification objective or focus depth. It should be noted that the microscope system 10 may have the desired sample on the stage 38, or the microscope system 10 may have to reload the desired sample on to the stage 38. Microscope system 10 captures an image representing its best guess at desired region 410. For example, the system may capture an image including an area corresponding to desired region 410, and also including an area large enough to encompass an expected offset inaccuracy. The actual captured image may be slightly different from what was intended. An example is illustrated as uncorrected area 415.

At 512 a decision is made on whether the captured image of uncorrected area 415 is sufficient for cross-correlation. The decision may be made by evaluating a number of factors, such as entropy, information content, self similarity or other factors, to determine whether the selected uncorrected area 415 is sufficient to use with a cross-correlation algorithm.

If the captured image is insufficient, the method may proceed to 514. At 514 the system identifies a better area for imaging. An algorithm analyzes the stored, reference image and identifies a neighboring area that has sufficient entropy, information content, self similarity and/or like measures for successful correlation. It is noted that, while the system may determine that a completely new area of the slide should be imaged for use in cross-correlation, it may also be acceptable to simply modify the FOV of desired region 410 and cross-correlate the modified view. For example, expanding the view may provide a unique area acceptable for cross-correlation. Once a new area has been identified, an image of the area is captured 516. This image is then analyzed to determine if it is sufficient for cross-correlation 512.

Once an image of sufficient quality is obtained a cross-correlation is performed 518. In performing the cross-correlation, microscope system 10 provides image and coordinate information for uncorrected area 415 and histological correlation area 420 as inputs to a cross-correlation algorithm. The cross-correlation algorithm calculates the location of uncorrected area 415, and can then calculate an offset representing the difference in locations between desired region 410 and uncorrected area 415.

For example, positional offsets at each of the four corners of the image can be derived, which would allow a computer program to compensate for offset positional adjustments including but not limited to translations, rotations, and/or scale differences.

The process determines at 520 whether uncorrected area 415 correlates with histological correlation area 420. While this determination may be a match percentage set by microscope system 10, an image program may also provide an interface for a user to adjust the match percentage depending on the user's requirements. If a correlation exists the process proceeds to 526. If there is not correlation, the process may proceed to 522.

At 522 a decision is made whether stop criteria are met. Stop criteria represent a condition or conditions in which microscope imaging system 10 would no longer attempt to cross-correlate. Examples of stop criteria include, but are not limited to, a threshold number of attempts to cross-correlate, a threshold maximum size of histological correlation area 420, a threshold time limit, or the like. It is further understood that stop criteria may be determined automatically by microscope imaging system 100 based upon a priori knowledge about the image, manually by a user, or in another manner.

If a stop criterion is met, the process ends. If no stop criterion are met, the process proceeds to 524 wherein the microscope system 10 expands the area of histological correlation area 420 to increase the probability that a correlation match will be made between uncorrected area 415 and a larger histological correlation area 420. While the amount to increase the histological correlation area 415 may be determined automatically by microscope system 10, an image program may also provide an interface for a user to adjust the correlation image depending on the user's requirements. Once the histological correlation area is redefined the process attempt to cross-correlate by returning to 518 in the process.

If correlation exists, the methods calculates offsets and repositions stage 38 according to the calculated offsets to obtain an image of desired region 410.

The methods of the disclosure may be combined with additional imaging algorithms and processes to identify objects or areas of interest in a sample. Such imaging process may be performed prior to, concurrently with, or after the exemplary processes set forth in FIGS. 4 and 5.

Additional imaging processes include color space conversion, low pass filtering, background suppression, artifact suppression, morphological processing, and blob analysis. Some or all of these additional imaging processes, and/or other imaging processes may be performed. The operator may optionally configure the system to perform any or all of these processes, and may configure the system to perform certain steps more than once or several times in a row.

For example, in the case of a sample comprising multiple markers stained with different agents, a vector of the average of r, g, and b values are made for each control slide stained with a single agent. A sample stained with multiple agents is then measured and the pixel value calculated. Each pixel channel obtained from the experimental sample will be proportional to the amount of the corresponding stain in an area of interest. A conversion factor determined from the controls is then used to directly and independently determine the amount of the multiple stains present in each pixel value (see, e.g., co-owned U.S. application Ser. No. 10/822,561, incorporated herein by reference).

In general, a candidate object of interest, such as a tumor cell, is detected based on a combination of characteristics, including size, shape, and color. In one aspect, a step in the detection of the candidate object of interest or area of interest is a measurement of a particular color in an image of the sample. For example, such a color analysis can be performed upon obtaining an image of the desired region following coordinate correction as described in FIG. 5.

Additional, exemplary methods include a process whereby a signal representative of a pixel color value is converted to a plurality of signals, each signal representative of a component color value including a hue value, a saturation value, and an intensity value. For each component color value, an associated range of values is set. The ranges together define a non-rectangular subvolume in HSI color space. A determination is made whether each of the component values falls within the associated range of values. The signal is then output, indicating whether the pixel color value falls within the color range in response to each of the component values falling within the associated range of values. The range of values associated with the hue value comprises a range of values between a high hue value and a low hue value, the range of values associated with the saturation value comprises a range of values above a low saturation value, and the range of values associated with the intensity value comprises a range of values between a high intensity value and a low intensity value.

Such methods can be executed on a system that may include a converter to convert a signal representative of a pixel color value to a plurality of signals representative of component color values including a hue value, a saturation value, and an intensity value. The hue comparator determines if the hue value falls within a first range of values. The apparatus may further include a saturation comparator to determine if the saturation value falls within a second range of values, as well as an intensity comparator to determine if the intensity value falls within a third range of values. In addition, a color identifier connected to each of the hue comparator, the saturation comparator, and the intensity comparator, is adapted to output a signal representative of a selected color range in response to the hue value falling within the first range of values, the saturation value falling within the second range of values, and the intensity value falling within the third range of values. The first range of values, the second range of values, and the third range of values define a non-rectangular subvolume in HSI color space, wherein the first range of values comprises a plurality of values between a low hue reference value and a high hue reference value, the second range of values comprises a plurality of values above a low saturation value, and the third range of values comprises a plurality of values between a low intensity value and a high intensity value.

In yet another approach, one could obtain color information by taking a single color component from the optical sensing array. As an example, consider a blue component, in which objects that are red are relatively dark. Objects which are blue, or white, are relatively light in the blue channel. In an embodiment a single color channel is used. A threshold is set. Everything darker than the threshold is categorized as a candidate object of interest, for example, a tumor cell, because it is red and hence dark in the channel being reviewed.

However, a conceivable problem with the single channel approach occurs where illumination is not uniform. Non-uniformity of illumination results in non-uniformity across the pixel values in any color channel, for example, tending to peak in the middle of the image and dropping off at the edges where the illumination falls off. Performing thresholding on this non-uniform color information may be difficult. As the edges sometimes fall below the threshold, and therefore it becomes more difficult to pick the appropriate threshold level. However, with the ratio technique, if the values of the red channel fall off from center to edge, then the values of the blue channel also fall off center to edge, resulting in a uniform ratio at non-uniform lighting. Thus, the ratio technique is more immune to illumination.

As described, the color conversion scheme is relatively insensitive to changes in color balance, e.g., the relative outputs of the red, green, and blue channels. However, some control is necessary to avoid camera saturation, or inadequate exposures in any one of the color bands. This color balancing is performed automatically by utilizing a calibration slide consisting of a clear area, and a "dark" area having a known optical transmission or density. The system obtains images from the clear and "dark" areas, calculates "white" and "black" adjustments for the image-frame grabber or image processor, and thereby provides correct color balance.

In addition to the color balance control, certain mechanical alignments are automated in this process. The center point in the field of view for the various microscope objectives as measured on the slide can vary by several (or several tens of) microns. This is the result of slight variations in position of the microscope objectives as determined by the turret, small variations in alignment of the objectives with respect to the system optical axis, and other factors. Since it is desired that each microscope objective be centered at the same point, these mechanical offsets must be measured and automatically compensated.

This can be accomplished by imaging a test slide that contains a recognizable feature or mark. An image of this pattern is obtained by the system with a given objective, and the position of the mark determined as well as color offsets. The system then rotates the turret to the next lens objective, obtains an image of the test object, and its position and color offsets are redetermined. Apparent changes in position of the test mark are recorded for this objective. This process is continued for all objectives. Once these spatial and color offsets have been determined, they are automatically compensated for mechanically by moving the XY stage by an equal (but opposite) amount of offset during changes in objective. In this way, as different lens objectives are selected, there is no apparent shift in center point or area viewed.

Erosion is a process whereby a single pixel layer is taken away from the edge of an object. Dilation is the opposite process, which adds a single pixel layer to the edges of an object. The power of morphological processing is that it provides for further discrimination to eliminate small objects that have survived the thresholding process and yet are not likely objects of interest (e.g., tumor cells). The erosion and dilation processes that make up a morphological "open" operation make small objects disappear yet allow large objects to remain. Morphological processing of binary images is described in detail in "Digital Image Processing", pages 127-137, G. A. Baxes, John Wiley & Sons, (1994).

As with any imaging system, there is some loss of modulation transfer (e.g., contrast) due to the modulation transfer function (MTF) characteristics of the imaging optics, camera, electronics, and other components. Since it is desired to save "high quality" images of cells of interest both for pathologist review and for archival purposes, it is desired to compensate for these MTF losses. An MTF compensation (MTFC) is performed as a digital process applied to the acquired digital images. A digital filter is utilized to restore the high spatial frequency content of the images upon storage, while maintaining low noise levels. With this MTFC technology, image quality is enhanced, or restored, through the use of digital processing methods as opposed to conventional oil-immersion or other hardware based methods. MTFC is described further in "The Image Processing Handbook," pages 225 and 337, J. C. Rues, CRC Press (1995).

Samples that are imaged by an automated microscope system 10 are generally stained with one or more standard stains (e.g., DAB, New Fuchsin, AEC), which are "reddish" in color. Candidate objects of interest retain more of the stain and thus appear red while normal cells remain unstained. The specimens may also be counterstained with hematoxylin so the nuclei of normal cells or cells not containing an object of interest appear blue. In addition to these objects, dirt and debris can appear as black, gray, or can also be lightly stained red or blue depending on the staining procedures utilized. The residual plasma or other fluids also present on a smear (or tissue) may also possess some color.

As used herein, a biological sample and/or subsample refers to a biological material obtained from or derived from a living organism. Typically a biological sample will comprise proteins, polynucleotides, organic material, cells, tissue, and any combination of the foregoing. Such samples include, but are not limited to, hair, skin, tissue, cultured cells, cultured cell media, and biological fluids. A tissue is a mass of connected cells and/or extracellular matrix material (e.g., CNS tissue, neural tissue, eye tissue, placental tissue, mammary gland tissue, gastrointestinal tissue, musculoskeletal tissue, genitourinary tissue, and the like) derived from, for example, a human or other mammal and includes the connecting material and the liquid material in association with the cells and/or tissues. A biological fluid is a liquid material derived from, for example, a human or other mammal. Such biological fluids include, but are not limited to, blood, plasma, serum, serum derivatives, bile, phlegm, saliva, sweat, amniotic fluid, mammary fluid, and cerebrospinal fluid (CSF), such as lumbar or ventricular CSF. A sample also may be media containing cells or biological material.

A biological sample may be embedded in embedding media such as paraffin or other waxes, gelatin, agar, polyethylene glycols, polyvinyl alcohol, celloidin, nitrocelluloses, methyl and butyl methacrylate resins or epoxy resins, which are polymerized after they infiltrate the specimen. Water-soluble embedding media such as polyvinyl alcohol, carbowax (polyethylene glycols), gelatin, and agar, may be used directly on specimens. Water-insoluble embedding media such as paraffin and nitrocellulose require that specimens be dehydrated in several changes of solvent such as ethyl alcohol, acetone, or isopropyl alcohol and then be immersed in a solvent in which the embedding medium is soluble. In the case where the embedding medium is paraffin, suitable solvents for the paraffin are xylene, toluene, benzene, petroleum, ether, chloroform, carbon tetrachloride, carbon bisulfide, and cedar oil. Typically a tissue sample is immersed in two or three baths of the paraffin solvent after the tissue is dehydrated and before the tissue sample is embedded in paraffin. Embedding medium includes, for examples, any synthetic or natural matrix suitable for embedding a sample in preparation for tissue sectioning.

The various techniques, methods, and aspects of the disclosure described herein can be implemented in part or in whole using computer-based systems and methods. Additionally, computer-based systems and methods can be used to augment or enhance the functionality described above, increase the speed at which the functions can be performed, and provide additional features and aspects as a part of, or in addition to, those of the disclosure described elsewhere in this document. Various computer-based systems, methods and implementations in accordance with the above-described technology are presented below.

A processor-based system for carrying out a method of the disclosure can include a main memory, typically random access memory (RAM), and can also include a secondary memory. The secondary memory can include, for example, a hard disk drive and/or a removable storage drive, representing a floppy disk drive, a magnetic tape drive, an optical disk drive, and the like. The removable storage drive reads from and/or writes to a removable storage medium. Removable storage medium refers to a floppy disk, magnetic tape, optical disk, or removable memory such as a flash disk or memory stick or the like, which is read by, and written to by, a removable storage drive. As will be appreciated, the removable storage medium can comprise computer software and/or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a movable memory chip (such as an EPROM or PROM) and associated socket, and other removable storage units and interfaces, which allow software and data to be transferred from the removable storage unit to the computer system.

The computer system can also include a communications interface. Communications interfaces allow software and data to be transferred between a computer system and external devices. Examples of communications interfaces can include a modem, a network interface (such as, for example, an Ethernet card), a communications port, a PCMCIA slot and card, and the like. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other communications channels.

A computer program medium and computer usable medium are used to refer generally to media such as a removable storage device, a disk capable of installation in a disk drive, and signals on a channel. These computer program products are means for providing software or program instructions to a computer system.

Computer programs (sometimes referred to as computer control logic) are stored in main memory and/or secondary memory. Computer programs can also be received via a communications interface. Such computer programs, when executed, enable the computer system to perform the features of the disclosure as discussed herein. In particular, the computer programs, when executed, enable the processor to perform the features of the disclosure. Accordingly, such computer programs represent controllers of the computer system.

In an embodiment where the elements are implemented using software, the software may be stored in, or transmitted via, a computer program product and loaded into a computer system using a removable storage drive, hard drive or communications interface. The control logic (software), when executed by the processor, causes the processor to perform the functions of the disclosure as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to person skilled in the relevant art(s). In yet another embodiment, elements are implanted using a combination of both hardware and software.

In another embodiment, the computer-based methods can be accessed or implemented over the World Wide Web by providing access via a Web Page to the methods of the disclosure. Accordingly, the Web Page is identified by a Universal Resource Locator (URL). The URL denotes both the server machine and the particular file or page on that machine. In this embodiment, it is envisioned that a consumer or client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hyper-text transport protocol ("HTTP")). The selected page is then displayed to the user on the client's display screen. The client may then cause the server containing a computer program of the disclosure to launch an application to, for example, perform an analysis according to the disclosure.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising: receiving initial image data corresponding to a first sample area of a biological sample; receiving initial positional information for the initial image data, the initial positional information indicative of an initial relative position of the first sample area with respect to an imaging system that obtained the data; using a positioner to reposition the first sample area with respect to the imaging system; receiving additional image data using the imaging system after repositioning the first sample area with respect to the imaging system; receiving additional positional information for the additional image data, the additional positional information indicative of a re-positioned relative position of the first sample area with respect to the imaging system; cross-correlating at least a portion of the initial image data and the additional image data using the associated initial image data, initial positional information, additional image data, and additional positional information; and determining an offset based on the cross-correlating.

2. The method of claim 1, further comprising: producing an output indicative of the offset.

3. The method of claim 2, further comprising: receiving the output indicative of the offset; repositioning the first sample area relative to the imaging system; and obtaining repositioned image data.

4. The method of claim 1, wherein the receiving the initial image data comprises reading the initial image data from a memory.

5. The method of claim 1, further comprising: determining whether the additional image data is sufficient for cross-correlation with the initial image data.

6. The method of claim 5, further comprising: if the additional image data is not sufficient for cross-correlation with the initial image data, receiving different additional image data.

7. The method of claim 5, wherein the determining whether the additional image data is sufficient for cross-correlation with the initial image data comprises comparing one or more conditions to one or more stop criteria.

8. The method of claim 1, wherein the offset comprises a translational offset.

9. The method of claim 1, wherein the offset comprises a rotational offset.

10. The method of claim 1, wherein the offset comprises a scale difference offset.

11. An article comprising a computer-readable storage medium storing instructions operable to cause one or more machines to perform operations comprising: receive initial image data obtained using an imaging system, the initial image data corresponding to a first sample area of a biological sample; receive initial positional information for the initial image data, the initial positional information indicative of an initial relative position of the first sample area with respect to the imaging system; receive additional image data using the imaging system, the additional image data obtained after repositioning the first sample area with respect to the imaging system; receive additional positional information for the additional image data, the additional positional information indicative of a re-positioned relative position of the first sample area with respect to the imaging system; cross-correlate at least a portion of the initial image data and the additional image data using the associated initial image data, initial positional information, additional image data, and additional positional information; and determine an offset based on the cross-correlating.

12. The article of claim 11, the operations further comprising: produce an output indicative of the offset.

13. The article of claim 12, the operations further comprising: receive the output indicative of the offset; and obtaining repositioned image data, the repositioned image data obtained after repositioning the first sample area relative to the imaging system.

14. The article of claim 11, wherein the receive the initial image data operation comprises a read the initial image data from a memory operation.

15. The article of claim 11, the operations further comprising: determine whether the additional image data is sufficient for cross-correlation with the initial image data.

16. The article of claim 15, the operations further comprising: if the additional image data is not sufficient for cross-correlation with the initial image data, receive different additional image data.

17. The article of claim 15, wherein the determine whether the additional image data is sufficient for cross-correlation with the initial image data operation comprises a compare one or more conditions to one or more stop criteria operation.

18. The article of claim 11, wherein the offset comprises a translational offset.

19. The article of claim 11, wherein the offset comprises a rotational offset.

20. The article of claim 11, wherein the offset comprises a scale difference offset.

21. An imaging system comprising: a positioner configured to position a sample relative to imaging optics; a controller in communication with the positioner, the controller configured to generate a signal to control the position of the sample relative to the imaging optics; an image processing system, the image processing system configured to: receive initial positional information for the initial image data, the initial positional information indicative of an initial relative position of the first sample area with respect to the imaging system; receive additional image data using the imaging system, the additional image data obtained after repositioning the first sample area with respect to the imaging system; receive additional positional information for the additional image data, the additional positional information indicative of a re-positioned relative position of the first sample area with respect to the imaging system; cross-correlate at least a portion of the initial image data and the additional image data using the associated initial image data, initial positional information, additional image data, and additional positional information; and determine an offset based on the cross-correlating.

22. The system of claim 21, wherein the image processing system is further configured to produce an output indicative of the offset.

23. The system of claim 22, wherein the controller is further configured to receive the output indicative of the offset and generate a signal indicative of a desired repositioning amount, and wherein the positioner is configured to receive the signal indicative of a desired repositioning amount and to reposition the sample relative to the imaging optics based on the signal.

* * * * *

UNITED STATES PATENT AND TRADEMARK OFFICE
CERTIFICATE OF CORRECTION

PATENT NO. : 7,627,153 B2 Page 1 of 1
APPLICATION NO. : 11/198018
DATED : December 1, 2009
INVENTOR(S) : Perz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Second Day of November, 2010

David J. Kappos
*Director of the United States Patent and Trademark Office*